United States Patent
Lee et al.

(10) Patent No.: US 9,826,428 B2
(45) Date of Patent: Nov. 21, 2017

(54) APPARATUS AND METHOD FOR DETECTING CONGESTION OF WIRELESS NETWORK IN COMMUNICATION SYSTEM

(71) Applicants: Samsung Electronics Co., Ltd., Gyeonggi-do (KR); Korea University Research and Business Foundation, Seoul (KR)

(72) Inventors: Woonghee Lee, Seoul (KR); Hwangnam Kim, Seoul (KR); Ok-Seon Lee, Gyeonggi-do (KR); Yong-Seok Park, Seoul (KR); Kang-Jin Yoon, Seoul (KR); Mungyu Bae, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 234 days.

(21) Appl. No.: 14/598,206

(22) Filed: Jan. 15, 2015

(65) Prior Publication Data

US 2015/0201349 A1 Jul. 16, 2015

(30) Foreign Application Priority Data

Jan. 15, 2014 (KR) .................. 10-2014-0005251

(51) Int. Cl.
*H04W 28/02* (2009.01)
*H04L 12/801* (2013.01)

(52) U.S. Cl.
CPC ....... *H04W 28/0236* (2013.01); *H04L 47/115* (2013.01); *H04L 47/193* (2013.01)

(58) Field of Classification Search
None
See application file for complete search history.

(56) References Cited

U.S. PATENT DOCUMENTS

| 8,125,902 B2 | 2/2012 | Rochon et al. |
| 2009/0268614 A1 * | 10/2009 | Tay .................. H04L 47/10 370/236 |

(Continued)

FOREIGN PATENT DOCUMENTS

KR    10-2011-0128147    11/2011

OTHER PUBLICATIONS

Huang, et al., "An ECN-Based Congestion Control Algorithm for TCP Enhancement in WLAN", 11th IEEE International Conference on High Performance Computing and Communications, 2009, pp. 464-469.

(Continued)

*Primary Examiner* — Anh Ngoc Nguyen

(57) ABSTRACT

Provided is an apparatus to detect congestion of a network using a receiver of a communication system. The apparatus includes a transport layer information extraction unit configured to extract transmission control protocol frame information from information that is received from a lower layer. The apparatus also includes a congestion information filtering unit configured to identify and output a packet to determine congestion in the transmission control protocol frame information. The apparatus further includes a congestion detection unit configured to determine whether the network is congested using the packet to determine congestion. The apparatus includes a congestion information output unit configured to, upon detecting congestion in the network, deliver information indicating the detection of the congestion in the network to an operating system or other applications.

18 Claims, 10 Drawing Sheets

(56) References Cited

U.S. PATENT DOCUMENTS

2011/0286329 A1 11/2011 Koo et al.
2014/0119184 A1* 5/2014 Harrang .................. H04L 47/10
370/235

OTHER PUBLICATIONS

Anelli, et al., "Transport Congestion Events Detection (TCED): Towards Decorrelating Congestion Detection from TCP", Jul. 5, 2010, 8 pages.
Mihara, et al., "Performance Evaluation of Fairness between High-Speed TCPs in Wireless Environment", Advanced Infocomm Technology. Springer Berlin Heidelberg, 2013, 15 pages.
Siddavatam, et.al, "Achieving Improved Performance at Access Point in WLAN Infrastructure Mode", International Journal on Computer Science and Engineering (IJCSE), vol. 3, No. 7, Jul. 2011, pp. 2869-2875.
Li, Feng, et al., "Measuring Queue Capacities of IEEE 802.11 Wireless Access Points", IEEE Fourth International Conference Broadband Communications, Networks and Systems, 2007, 8 pages.
Gong, et al., "Queue Management Strategies to Improve TCP Fairness in IEEE 802.11 Wireless LANs", 2006 4th Modeling and Optimization in Mobile, Ad Hoc and Wireless Networks, 2006, 8 pages.
Jardosh, et al., "IQU: Practical Queue-Based User Association Management for WLANs", Proceedings of the 12th Annual International Conference on ACM Mobile Computing and Networking, 2006, 2 pages.
Jardosh, et al., "Understanding congestion in IEEE 802.11 b wireless networks", Proceedings of the 5th ACM SIGCOMM Conference on Internet Measurement, USENIX Association, 2005, 14 pages.

* cited by examiner

| | | | | | |
|---|---|---|---|---|---|
| 584 | 4.710183 | 192.168.0.44 | 1.226.51.189 | TCP | 66 | 35319 > HTTP [ACK] Seq...... |
| 585 | 4.710213 | 1.226.51.189 | 192.168.0.44 | HTTP | 1514 | [TCP Out-of-order]HTTP/1.1 200 OK (JPEG JFIF image) |
| 586 | 4.710610 | 192.168.0.44 | 1.226.51.189 | TCP | 66 | 35319 > HTTP [ACK] Seq...... |
| 587 | 4.710671 | 192.168.0.44 | 1.226.51.189 | 587 | 78 | [TCP Dup ACK 586#1]http [ACK] Seq...... |
| 588 | 4.710793 | 192.168.0.44 | 1.226.51.189 | TCP | 66 | 35319 > HTTP [ACK] Seq...... |
| 589 | 4.845366 | 192.168.0.44 | 163.152.1.1 | DNS | 83 | Standard query Oxaece...... |
| 590 | 4.927226 | 192.168.0.44 | 112.175.248.19 | HTTP | 575 | GET / image/news/m/2013/03/...... |
| 591 | 4.929573 | 192.168.0.44 | 112.175.248.19 | HTTP | 574 | GET / image/news/m/2013/01/...... |
| 592 | 4.932348 | 192.168.0.44 | 112.175.62.84 | HTTP | 574 | GET / image/news/m/2013/01/...... |
| 593 | 5.134726 | 192.168.0.44 | 112.175.248.19 | HTTP | 575 | [TCP Retransmission] GET/image...... |
| 594 | 5.134787 | 192.168.0.44 | 112.175.248.19 | HTTP | 574 | [TCP Retransmission] GET/image...... |
| 595 | 5.134817 | 192.168.0.44 | 112.175.62.84 | HTTP | 574 | [TCP Retransmission] GET/image...... |
| 596 | 5.317348 | 163.152.1.1 | 192.168.0.44 | DNS | 305 | Standard query Oxaece...... |
| 597 | 5.318567 | 192.168.0.44 | 58.227.194.92 | TCP | 74 | 58945 > http [SYN] Seq=0 Win=5840...... |
| 598 | 5.554390 | 192.168.0.44 | 112.175.248.19 | HTTP | 575 | [TCP Retransmission] GET/image...... |
| 599 | 5.554451 | 192.168.0.44 | 112.175.248.19 | HTTP | 574 | [TCP Retransmission] GET/image...... |
| 600 | 5.554482 | 192.168.0.44 | 112.175.62.84 | HTTP | 574 | [TCP Retransmission] GET/image...... |
| 601 | 5.833171 | 112.175.248.19 | 192.168.0.44 | TCP | 1514 | [TCP segment of a reassembled PDU] |

FIG.5

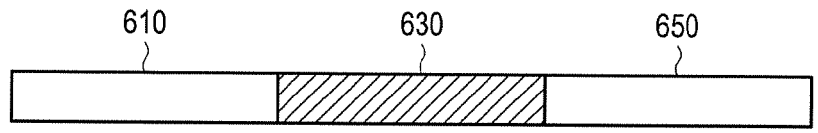
FIG.6
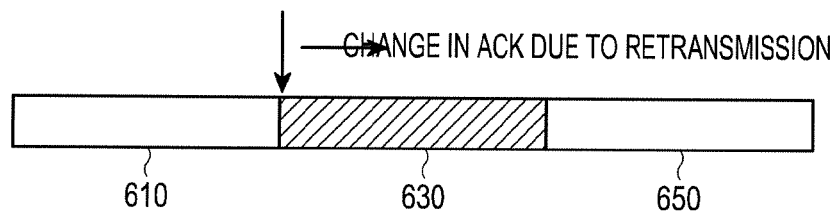
FIG.7
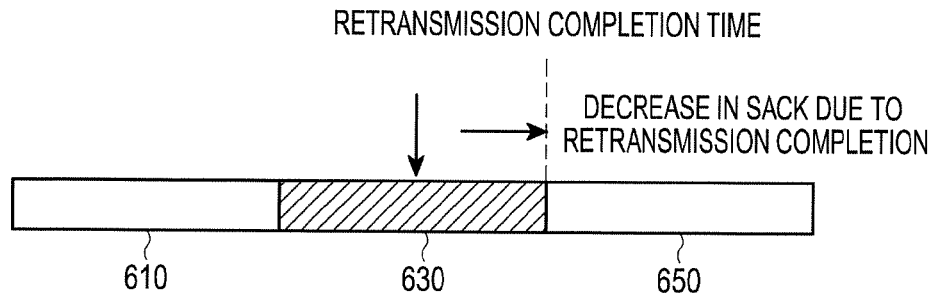
FIG.8A
FIG.8B

APPARATUS AND METHOD FOR DETECTING CONGESTION OF WIRELESS NETWORK IN COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jan. 15, 2014 and assigned Serial No. 10-2014-0005251, the entire disclosure of which is incorporated herein by reference.

TECHNICAL FIELD

The present disclosure relates to an apparatus and method for detecting congestion of a wireless network in a communication system.

BACKGROUND

Due to the development of software and hardware and the development of communication technology, many devices have been developed as portable devices. Not only the smart phones, but also many other devices such as laptop Personal Computers (PCs), tablet PCs and MP3 players support a Wireless Local Area Network (WLAN), and the number of spots where the WLAN is available has been on the rise. For example, many Access Point (AP) networks are installed in the public places such as cafes, subway stations and airports, allowing users to access the WLAN anywhere anytime. Therefore, the Internet traffic has increased exponentially.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an apparatus and method for detecting congestion of a wireless network in a communication system.

Another aspect of an embodiment of the present disclosure is to provide an apparatus and method for detecting congestion so as to make it possible to control congestion of a wireless network without modifying the existing protocol in a communication system. Another aspect of an embodiment of the present disclosure is to provide an apparatus and method for detecting congestion of a wireless network in a terminal of a communication system. Another aspect of an embodiment of the present disclosure is to provide an apparatus and method for detecting congestion of a wireless network with the low power in a communication system.

In a first example, an apparatus to detect congestion of a network in a receiver of a communication system is provided. The apparatus includes a transport layer information extraction unit configured to extract transmission control protocol frame information from information that is received from a lower layer. The apparatus also includes a congestion information filtering unit configured to identify and output a packet to determine congestion in the transmission control protocol frame information. The apparatus further includes a congestion detection unit configured to determine whether the network is congested using the packet for determining congestion. The apparatus includes a congestion information output unit configured to, upon detecting congestion in the network, deliver information indicating the detection of the congestion in the network to an operating system or other applications.

In a second example, a method to detect congestion of a network in a receiver of a communication system is provided. The method includes extracting transmission control protocol frame information from information that is received from a lower layer. The method also includes identifying and outputting a packet to determine congestion in the transmission control protocol frame information. The method further includes determining whether the network is congested using the packet to determine congestion. The method includes upon detecting congestion in the network, delivering information indicating the detection of the congestion in the network to an operating system or other applications.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates an example of transmission control protocol (TCP) frame information identified by a congestion information filtering unit according to this disclosure;

FIG. 6 illustrates an example of a series of TCP frames according to this disclosure;

FIG. 7 illustrates an example of an ACK packet including TCP frame information according to this disclosure;

FIGS. 8A and 8B illustrate examples determining a packet including retransmission information in a congestion information filtering unit according to this disclosure;

Throughout the drawings, like reference numerals will be understood to refer to like parts, components, and structures.

DETAILED DESCRIPTION

Figure 1:
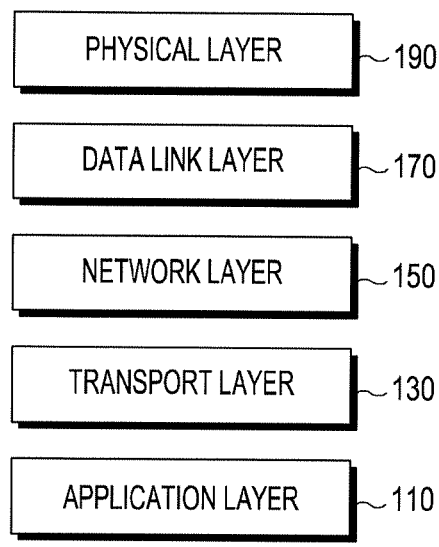
FIG. 1 illustrates an example configuration of 5 layers in a general open system interconnection (OSI) 7 layer model according to this disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system and electronic device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Due to the development of software and hardware and the development of communication technology, many devices have been developed as portable devices. Not only the smart phones, but also many other devices such as laptop Personal Computers (PCs), tablet PCs and MP3 players support a Wireless Local Area Network (WLAN), and the number of spots where the WLAN is available has been on the rise. For example, many Access Point (AP) networks are installed in the public places such as cafes, subway stations and airports, allowing users to access the WLAN anywhere anytime. Therefore, the Internet traffic has increased exponentially.

The phenomenon, in which the number of packets existing in the network of the communication system increases excessively, is referred to as 'congestion'. For example, if a packet is received faster than the packet processing speed of the wireless network that serves as an intermediate node in packet transmission, the congestion occur. If the congestion occurs, a packet is removed since a buffer of one node in the network overflows. In addition, since a packet stay in the network for a long time due to the congestion, a reception node waiting for the packet to be received request retransmission of the packet, determining that the packet is lost, if the packet has not arrived for more than a predetermined time. A method for preventing this problem is referred to as a congestion control method.

In the case of wireless communication, while one end of the wireless network (such as the AP network) is connected to a wired interface, another end thereof is connected to a wireless interface. A transmission or reception rate difference due to the difference between the wired and wireless interfaces occurs more frequently in wireless communication, compared with in wired communication, causing a decrease in data throughput. If the congestion occurs, a transmission node controls the congestion in the way of decreasing its transmission rate by reducing a window size. However, if this control lasts, the reception node continuously receives a communication service at a low rate.

In the case of wired communication, packet missing due to errors in transmission is very rare compared with in wireless communication, so the accuracy of congestion detection is relatively high. However, in the case of wireless communication, packet missing due to transmission errors in addition to the packet missing due to the congestion also occurs very frequently compared with in wired communication. Therefore, in the case of wireless communication, the accuracy of congestion detection is low at the transmission node. Since the reception node is an entity that receives data, the accuracy of congestion detection is relatively higher, if the reception node detects the congestion. If the existing congestion control method is modified, a lot of extra work and cost are required in order to modify and apply the protocol. Therefore, there is a need for a way to detect the congestion so as to control the congestion without modifying the existing protocol.

In the case of wireless communication, since a wireless terminal has a limitation on power supply due to its characteristics, the power efficiency should necessarily be considered, and is evaluated as an important indicator of the performance. Therefore, there is a need for a way to detect the congestion at the high accuracy with the low power. In addition, in the case of wireless communication, handover is required. The handover occurs, when the communication is disconnected or the communication condition is very poor, and if the communication condition cannot reach predetermined criteria, the user may not enjoy satisfactory services. Therefore, there is a need for a way to detect the congestion so as to provide the high-performance service to the user.

The subject matter of the present disclosure is to detect, with the low power, the congestion that occurs in the situation where a wireless terminal communicates with a wireless network. To this end, the background of the communication system, to which an embodiment of the present disclosure is applied, is described first, and then an apparatus and method for detecting congestion of a wireless network according to an embodiment of the present disclosure will be described in detail. Since an Access Point (AP) network corresponds to a wireless network in the communication system, the wireless network and the AP network will be interchangeably used, for convenience purposes only.

First, all the communication procedures necessary for interconnection over a communication network are defined, and then 7 layers will be set by dividing a module providing the similar function among the functions required for communication in the same layer. This will be called an Open System Interconnection (OSI) 7 layer model. 5 layers among the 7 layers perform communication by sharing the substantial role, as shown in FIG. 1. FIG. 1 illustrates an example configuration of 5 layers in a general open system interconnection (OSI) 7 layer model according to this disclosure.

Referring to FIG. 1, 5 layers performing the substation role in the OSI 7 layer model includes a physical layer 110, a data link layer 170, a network layer 150, a transport layer 130, and an application layer 190. Here, a method for detecting congestion of a wireless network according to an embodiment of the present disclosure is performed in the transport layer 130, and a description of the transport layer 130 is as follows.

The transport layer 130, which is a layer located on the fourth layer in the OSI 7 layer model, enables end-to-end users to reliably exchange data so that the upper layer may not additionally consider the validity or efficiency of the data transmission. In addition, the transport layer 130 determines whether the transmission of packets is performed without problem, using the serial number, and retransmits the packets that are failed in transmission. Further, the transport layer 130, which is the lowest layer covering the end-to-end communication, performs error detection and recovery, and flow control, for reliable and efficient data transmission. Protocols used in the transport layer 130 is typically divided into a transmission control protocol (TCP) and a user datagram protocol (UDP), and an embodiment of the present disclosure is based on the TCP.

The TCP, which is a protocol for controlling information delivery of the network, is often referred to as TCP/IP, since the TCP operates based on the Internet Protocol (IP). When a packet is lost as a certain error or problem occurs in the packet, or when a packet is transmitted in the wrong order, TCP detect it and request retransmission in order to guarantee the transmission of data. In addition, TCP is used when connection-oriented and reliable data transmission is required, and performs flow control and congestion control so that a packet is reliably transmitted and received. Of these, the congestion control is related to an embodiment of the present disclosure. Here, the congestion control is to control the phenomenon that the number of packets existing in the network increases excessively.

Wireless communication is more complex, since the mobility of users should be considered unlike in wired communication. When the wireless communication is performed, radio waves are transmitted through the air, instead of being transmitted through a fixed medium. Thus, the communication may not be performed, if a wireless terminal is out of the range where the radio waves can reach. Therefore, there is a need for access management technology for automatically disconnecting the existing connection and making a new connection when a terminal of the user moves, to another area, from the area where a signal of the base station or the AP network, to which the terminal is connected, reaches, and the operation is called handover or handoff. When the terminal uses the AP network, the indicator that is mainly used as the criteria for performing a handover is a Received Signal Strength (RSS), and the most important handover occurrence conditions mentioned in the studies that are in progress on the handover includes the time that communication is impossible as the terminal is out of the area where the signal can reach, or the time that a seamless service is unavailable as the RSS or Carrier to Interference Ratio (CIR) is less than a threshold.

In addition, TCP determines whether data is normally received, using the sequence number in a data header and requests retransmission from a sender, if a packet is missing or a damaged packet has arrived. Retransmission basically includes a method based on Acknowledge (ACK). In this method, if a reception node sends an ACK for the received data, it means normal reception, and if the reception node sends a Negative ACK (NAK), it means abnormal reception. Therefore, a transmission node retransmits the data, if the transmission node fails to receive an ACK value within a predetermined time or has received a NAK code value from the reception node. One of the techniques most frequently used in retransmission includes fast retransmission. If one packet is missing or data is received in the incorrect order of a sequence number, a recipient sends a duplicated ACK containing the next number (such as a sequence number of the packet to be received) of the normally received packet to the sender. If the duplicated ACK arrives at the sender three times, the sender immediately retransmits the data beginning at the packet of a sequence number that the recipient should receive.

The background to which an embodiment of the present disclosure is applied has been described so far, and an apparatus and method for detecting congestion of a wireless network according to an embodiment of the present disclosure will now be described in detail. First of all, an embodiment of the present disclosure provides a method in which a reception node (such as a wireless terminal) detects congestion, rather than a method in which a transmission node of the wireless communication system detects congestion, and due to the advantages capable of improving the limitations and problems of the conventional method and the advantages of low power, the proposed method is suitable for the user of the wireless terminal in the wireless communication environment. The embodiment of the present disclosure exhibits the following advantages.

First, an embodiment of the present disclosure enables real-time congestion prediction with the low power. In the case of wireless communication, the power efficiency acts as a very important factor compared with in wired communication, due to the characteristics of the wireless terminal. No matter how outstanding performance the technology guarantees, if power consumption of the technology is high, the technology may not be applied to the wireless terminal, thus dropping the value of the technology. Therefore, the low power is required for congestion detection in the wireless communication environment, meaning that if the power consumption is lower, the continuous congestion detection is possible in real time in the wireless terminal.

Second, an embodiment of the present disclosure enables accurate congestion detection. In the case of wireless communication, since a data transfer rate is very low compared with in wired communication, the congestion frequently occurs in the AP network that is directly connected to the destination node. Therefore, an embodiment of the present disclosure has the geographical advantages that the congestion is detected faster if the wireless terminal which is the destination node detects the congestion, and the advantages that the proposed method is higher in accuracy than the conventional method in which the transmission node detects the congestion, since the proposed method allows the reception node to detect the congestion by directly receiving the data.

Third, an embodiment of the present disclosure enables independent response. In the conventional method in which the transmission node detects congestion, there are few things the reception node does when the communication quality is degraded, and even though there is an AP network capable of better communication, the reception node waits for only the control of the transmission node without performing a handover by the existing criteria for handover. However, in an embodiment of the present disclosure, the operating entity is a wireless terminal which is a reception node, providing an opportunity that the user independently selects the better communication environment, and meaning that the user more flexibly responds to the network environment.

Fourth, an embodiment of the present disclosure does not require modification of the existing protocol. The congestion control is a technique that is included in a protocol, and the protocol cannot be modified arbitrarily. However, an embodiment of the present disclosure allows a wireless terminal to collect TCP frame information through an application and detect the congestion based on the collected information, meaning that it is possible to simply apply the existing protocol without modification. Modifying the existing system is a significant constraint in applying the technology, because the notification does not mean only the simple modification, but requires modification or replacement of the entire system.

Figure 2:
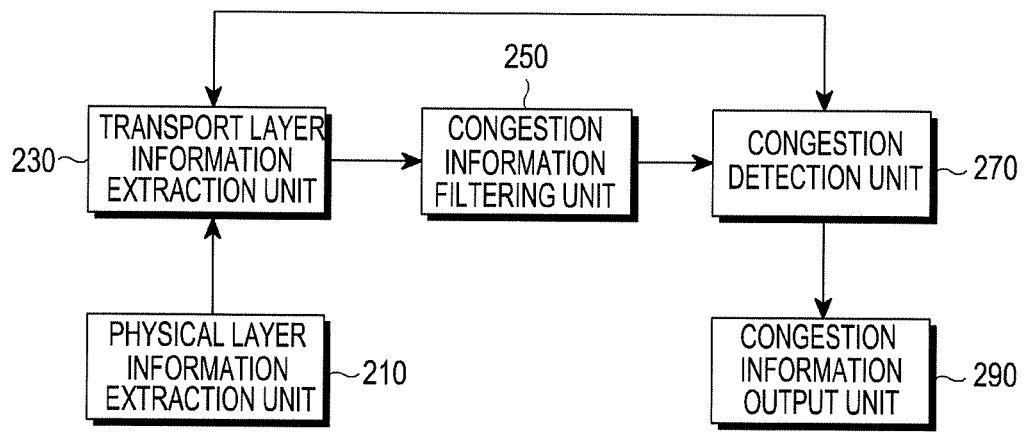
FIG. 2 illustrates an example apparatus to detect congestion of a wireless network according to this disclosure.

FIG. 2 illustrates an example apparatus to detect congestion of a wireless network according to this disclosure. Referring to FIG. 2, an apparatus for detecting congestion of a wireless network according to an embodiment of the present disclosure includes a physical layer information extraction unit 210, a transport layer information extraction unit 230, a congestion information filtering unit 250, a congestion detection unit 270 and a congestion information output unit 290.

The physical layer information extraction unit 210 collects and extracts all physical communication signals that are transmitted to a wireless terminal. If the physical layer information extraction unit 210 is performing communication based on the IEEE 802.11 standard, the physical layer information extraction unit 210 delivers the extracted IEEE 802.11 standard-based information to an upper layer. The transport layer information extraction unit 230 receives the IEEE 802.11 standard-based information extracted in the physical layer through a data link layer, collects and extracts only the TCP frame information from the received information, and delivers the extracted TCP frame information to the congestion information filtering unit 250. The information that is received at the transport layer information extraction unit 230 from the lower layer exists in the form suitable for the transport layer protocol such as a TCP frame or a UDP frame. Since the information required in an embodiment of the present disclosure is a packet that is based on the TCP standard, the transport layer information extraction unit 230 collects and extracts only the TCP frame information.

The congestion information filtering unit 250 identifies a packet for determining congestion in the extracted TCP frame information, and delivers the identified packet to the congestion detection unit 270. In accordance with an embodiment of the present disclosure, if the identified packet is a packet that is received from a plurality of transmission nodes, the congestion information filtering unit 250 classifies the identified packet according to the transmission node. Here, the packet for determining congestion is a packet including retransmission information.

The wireless terminal accesses the AP network to continuously transmit and receive data to or from the AP network. Due to the wire or wireless communication rate difference between both interfaces of the AP network, congestion is highly likely to occur in the AP network that is connected to the wireless terminal, meaning that the packet missing or queuing delay is highly likely to occur.

The cases where a reception node requests retransmission from a transmission node includes the cases where the reception node determines that there is a problem with the packet transmission or reception by the TCP frame information of the reception node, such as 1) a case where no packet has arrived at the reception node due to the packet missing or error, 2) a case where the reception node determines that a packet is lost, because the time a packet arrives at the reception node increases as the queuing delay increases due to the congestion, and 3) a case where a packet arrives in the changed order because the transmission time difference between packets is large due to the congestion. The most frequent case among the cases for requesting retransmission is 1) the case where no packet has arrived at the reception node due to the packet missing or error, and this case is illustrated in FIG. 3.

Figure 3:
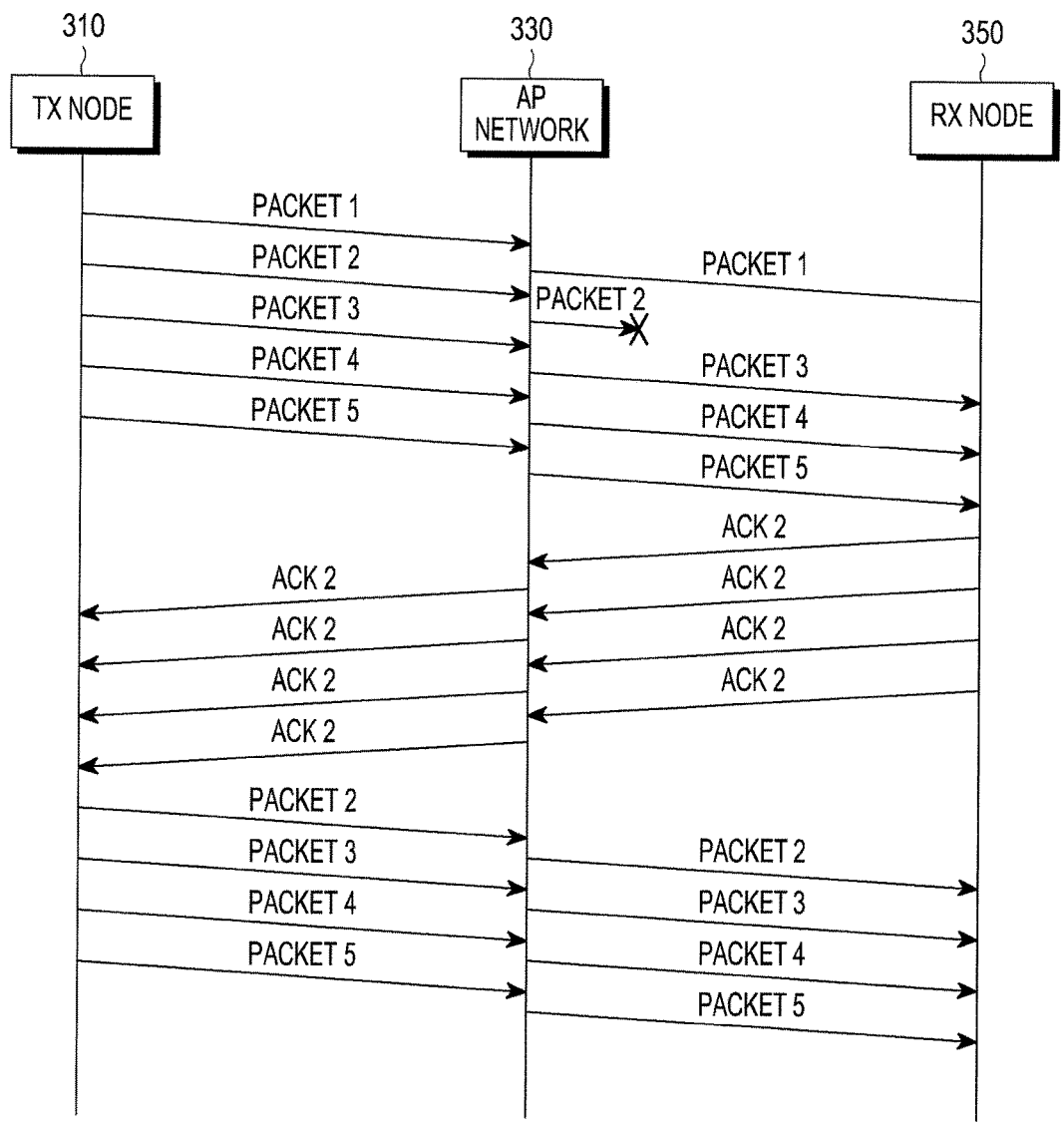
FIG. 3 illustrates an example situation in which fast retransmission of a Go-back-N ARQ scheme occurs, in a case where no packet has arrived at a reception node due to the packet missing or error, among the cases for requesting retransmission according to this disclosure.

FIG. 3 illustrates an example situation in which fast retransmission of a Go-back-N ARQ scheme occurs, in a case where no packet has arrived at a reception node due to the packet missing or error, among the cases for requesting retransmission according to this disclosure. The Go-back-N ARQ scheme is a scheme of retransmitting all packets following the packet in which an error has occurred. Referring to FIG. 3, when a transmission node 310 transmits data to a reception node 350, the data is transmitted from the transmission node 310 to an AP network 330 through wired communication, and transmitted from the AP network 330 to the reception node 350 through wireless communication.

Here, if a packet 2 is lost in the AP network 330 while the transmission node 310 transmits a packet 1 to a packet 5 to the reception node 350, the AP network 330 transmits the packet 3 (which is the next packet) to the packet 5 to the reception node 350. In this case, upon receiving the packet 1, the reception node 350 sends an ACK 2 to the transmission node 310 through the AP network 330. Since the reception node 350 receives the packet 3 without receiving the packet 2 at the time it should receive the packet 2, the reception node 350 sends again the ACK 2 for requesting retransmission of the packet 2 to the transmission node 310. Even if the reception node 350 has received the packet 4 and the packet 5, the reception node 350 sends again the ACK 2 to the transmission node 310 in the same way. In this process, the ACK 2 that the reception node 350 first sends is called an original ACK, and the ACK 2 that the reception node 350 sends since then is called a duplicated ACK.

If the transmission node 310 receives 3 duplicated ACKs 2, the transmission node 310 immediately performs retransmission, predicting that the packet 2 is lost. This is called fast retransmission. If fast retransmission occurs, the transmission node 310 transmits again the packets in order to the reception node 350 beginning at the lost packet 2.

The above-described Go-back-N ARQ is inefficient in the noisy channel. In the noisy channel, a packet is highly likely to be damaged, meaning that a plurality of packets is retransmitted. Therefore, due to the retransmission, the bandwidth is consumed and the transmission rate may also be reduced. On the other hand, a selective repeat ARQ scheme, unlike the Go-back-N ARQ scheme, selects and retransmits only the lost packet, instead of retransmitting all packets following the packet at the time the packet lost occurred.

Figure 4:
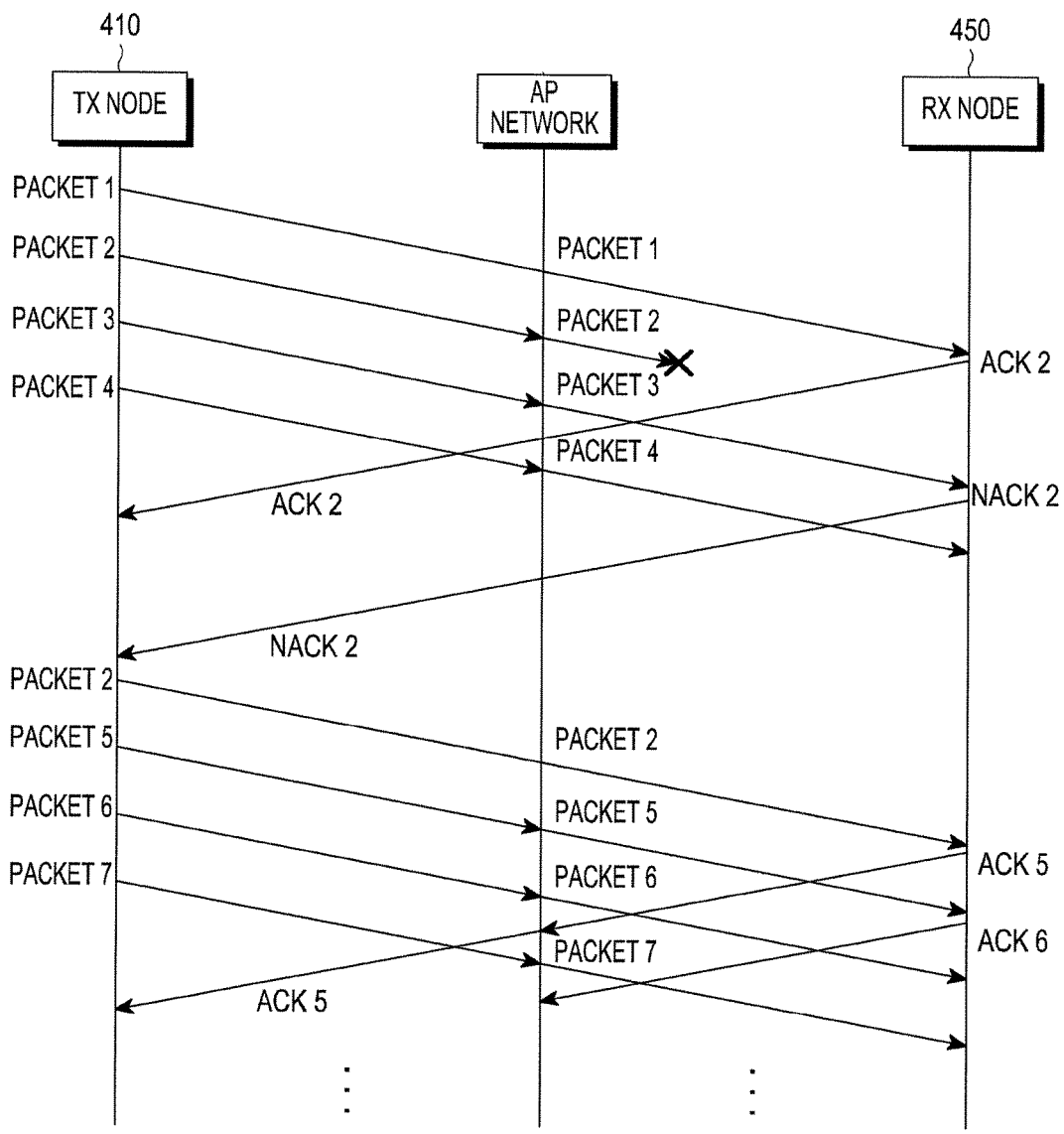
FIG. 4 illustrates an example selective repeat ARQ scheme according to this disclosure.

FIG. 4 illustrates an example selective repeat ARQ scheme according to this disclosure. Referring to FIG. 4, if a reception node 450 finds a transmission error for a packet 2 while receiving a packet 1 to a packet 7 from a transmission node 410, the reception node 450 sends a NAK 2 to the transmission node 410, and store the packets received since then in a buffer. If the lost packet 2 is retransmitted from the transmission node 410, the reception node 450 reorders the packets stored in the buffer. As described above, the selective repeat ARQ scheme is superior in performance to the Go-back-N ARQ scheme since it retransmits only the selected packets, but the selective repeat ARQ scheme requires additional buffer and algorithms. Accordingly, in TCP, the Go-back-N ARQ scheme and the selective repeat ARQ scheme is used in combination. The case where the above-described retransmission between a transmission node and a reception node has occurred is determined based on TCP frame information in FIG. 5.

FIG. 5 illustrates an example of transmission control protocol (TCP) frame information identified by a congestion information filtering unit according to this disclosure. Referring to FIG. 5, the congestion information filtering unit 250 monitors the TCP frame information to determine and filter a packet (such as the parts marked by yellow rectangles) including retransmission information. This retransmission information is not the information that is directly specified in the packet, and FIG. 5 shows the results obtained by analyzing packets using a separate program for analyzing packets so as to show that retransmission information is determined using a packet. Therefore, in order to obtain retransmission information, there is a need for an additional algorithm capable of extracting retransmission information by analyzing packets.

FIG. 6 illustrates an example of a series of TCP frames according to this disclosure. Reference numerals 610 and 650 represent the received parts, and reference numeral 630 represents the part that is not received. FIG. 7 illustrates an example of an ACK packet including TCP frame information. The congestion information filtering unit 250 according to an embodiment of the present disclosure identifies ACK packets including TCP frame information in the following way, to determine whether an ACK packet is a packet including retransmission information. Referring to FIG. 7, the congestion information filtering unit 250 determines whether an ACK packet is a packet including retransmission information, based on the parts 710, 730 and 750 marked by rectangles in the ACK packet included in a TCP frame.

Reference numeral 710 represents a sequence number of the ACK packet, reference numeral 730 represents the number of packet sets received after transmission failure, and reference numeral 750 represents the first frame number and the last frame number the a packet set received after transmission failure. Brackets represent one set. If the number of packet sets received after transmission failure is 2 or more, the packet sets are marked by multiple brackets. An example of the ACK packet shown in FIG. 7 is simply written as Equation (1).

$$\text{ack } a_n \text{win } w_n[\text{nop,nop,sack } s_n\{p_{n:q\_n}\}] \quad (1)$$

where $a_n$ denotes a sequence number of an ACK packet, $w_n$ denotes a window size, $s_n$ denotes the number of packet sets received after transmission failure, and $\{p_n:q_n\}$ denotes a packet set received after transmission failure.

For example, if information about the ACK packet as shown in FIG. 7 is shown for the TCP frame in FIG. 6, reference numeral 650 represents a packet set received after transmission failure, and since the number of packet sets is one, a selective ack (sack) 730 is 1, numbers in front of the brackets 750 represent the front frame number, and numbers at the rear of the brackets 750 represent the last frame number. If values of the following two cases are included in the TCP frame information, the congestion information filtering unit 250 determines that the ACK packet is a packet including retransmission information.

FIGS. 8A and 8B illustrate examples determining a packet including retransmission information in a congestion information filtering unit according to this disclosure. Referring to FIG. 8, the cases where the congestion information filtering unit 250 determines an ACK packet as a packet including retransmission information based on the received TCP frame information includes (1) a case where an ACK value changes as retransmission continues to occur, and (2) a case where the number of packet sets received after transmission failure is reduced due to the last retransmission. First, upon failure to receive a packet, a reception node requests packet retransmission from a transmission node. Accordingly, if an ACK value changes when a retransmitted packet is normally received (see FIG. 8A), the congestion information filtering unit 250 determines that the ACK packet is a packet including retransmission information. If a sack value is reduced at the time all frames of a packet set are normally and completely received due to the last retransmission while the retransmission of the reception-failed packet set continues to take place (see FIG. 8B), the congestion information filtering unit 250 determines that the ACK packet is a packet including retransmission information.

Referring back to FIG. 2, after determining a packet including retransmission information using the above-described methods, the congestion information filtering unit 250 delivers the determined packet to the congestion detection unit 270. The congestion detection unit 270 determines whether the network status is congested, in the following way using the packet delivered from the congestion information filtering unit 250. The congestion detection unit 270 accumulates the packet (such as the packet including retransmission information) delivered from the congestion information filtering unit 250, and determine whether the network status is congested, based on the fact that as the frequency of occurrence of a packet including retransmission information is higher, the possibility of congestion is higher. In other words, the congestion detection unit 270 basically monitors the number of frames that are transmitted and received, and determine from Equation (2) to Equation (4) whether the network status is congested.

$$CP_{acc}=CP_{latest}+CP_{past} \quad (2)$$

$$TP_{acc}=TP_{latest}+TP_{past} \quad (3)$$

$$CP_{acc} \geq \alpha \times TP_{acc} \quad (4)$$

In Equation (2), $CP_{latest}$ denotes the number of congestion packets that have been received during the last $t_1$ minutes, $CP_{past}$ denotes the number of congestion packets that have been received during $t_2$ minutes since the last $t_1$ minutes, and $CP_{acc}$ denotes the number of congestion packets that have been received during the last $(t_1+t_2)$ minutes. In Equation (3), $TP_{latest}$ denotes the total number of packets that have been received during the last $t_1$ minutes, $TP_{past}$ denotes the total number of packets that have been received during $t_2$ minutes since the last $t_1$ minutes, and $TP_{acc}$ denotes the total number of packets that have been received during the last $(t_1+t_2)$ minutes. In Equation (4), $\alpha$ denotes a value indicating the quality of communication. As $\alpha$ is closer to zero (0), the communication quality is sensitive to congestion, and as $\alpha$ is closer to one (1), the communication quality is less sensitive to congestion. If Equation (4) is satisfied by Equation (2) and Equation (3), the congestion detection unit 270 determines that the network status is congested.

In addition, the congestion detection unit 270 basically monitors the number of frames that are transmitted and received, and determine whether the user is now mainly performing the works requiring data transmission/reception. If a very high reliability should be given to the latest data than the past data as in the case where the user performs the works requiring data transmission/reception while not performing the works requiring data transmission/reception, or as in the opposite case, then the congestion detection unit 270 may not consider the past data such as $CP_{past}$ or $TP_{past}$. In this case, the congestion detection unit 270 determines whether the network status is congested, using Equation (5) below.

$$(TP_{latest}/TP_{acc}) \geq Th_{high}, Th_{low} \geq (TP_{latest}/TP_{acc}) \quad (5)$$

where $Th_{high}$ and $Th_{low}$ denote upper and lower limits of a threshold, respectively. Here, if a ratio of $TP_{latest}$ to $TP_{acc}$ is not present between two threshold values (such as if recent changes in the number of transmitted/received frames are large), the congestion detection unit 270 determines whether the network status is congested using only the latest data, determining that a situation has occurred, in which a very high reliability should be given to the latest data than the past data.

Therefore, in the case of the situation in which a very high reliability should be given to the latest data than the past data, Equation (2) to Equation (4) is converted to Equation (6) to Equation (8). The congestion detection unit 270 determines whether the network status is congested, considering only the last $t_1$ minutes without considering the total time of $(t_1+t_2)$ minutes.

$$CP_{acc}=CP_{latest} \quad (6)$$

$$TP_{acc}=TP_{latest} \quad (7)$$

$$CP_{acc} \geq \alpha \times TP_{acc} \quad (8)$$

In the wireless network situation, changes in the data throughput are relatively frequent and the width thereof is also large compared with in the wired network situation, since the wireless network situation is more unstable than the wired network situation. In addition, a burst error that a collective error occurs temporarily is also highly likely to occur. Accordingly, the congestion detection unit 270 according to an embodiment of the present disclosure should take into account a variety of situations associated with the burst error and the changes in data throughput, and among them, the typical situation to be considered is as follows.

First, a case where there is no burst error and the change in data throughput is insignificant corresponds to the most basic case where the burst error doesn't have to be considered, and the congestion detection unit 270 determines whether the network status is congested, using Equation (2) to Equation (8). In addition, a case where there is no reduction in data throughput despite the burst error is not the case that frequently appears in the real situation. However, if this case occurs, the congestion detection unit 270 unnecessarily determines that the network condition is poor, due to the burst error despite the high data throughput. Therefore, in order to determine the burst error, the congestion detection unit 270 should additionally take into account an element for checking retransmission that occurs during a relatively very short period of time as shown in Equation (9).

$$Rate_{cp}=(CP_{moment}/TP_{moment}) \quad (9)$$

where $Rate_{cp}$ denotes a congestion packet rate, and is a value that shows an instantaneous reception rate of a congestion packet that occurs for a short period of time. Accordingly, as shown in Equation (9), $Rate_{cp}$ is obtained by dividing $CP_{moment}$ indicating the number of congestion packets that are received for a short time by $TP_{moment}$ indicating the total number of packets that are received for the same time. If there is a burst error, a value of $Rate_{cp}$ increases instantaneously and significantly. Thus, the congestion detection unit 270 determines that a burst error has occurred, if the value of $Rate_{cp}$ exceeds a predetermined threshold $Th_{be}$ which is a burst error criterion as shown in Equation (10) below.

$$Rate_{cp} \geq Th_{be} \quad (10)$$

If a burst error occurs as described above, the congestion detection unit 270 may not consider the burst error when filtering the packet and determining whether the network status is congested. In addition, if the status of a back-end network or a server is poor, retransmission occurs. In this case, even though the AP network is not congested, the congestion detection unit 270 determines that the AP network is congested. Therefore, in order to solve this problem, the number of retransmission packets and the total number of packets is separately recorded for each transmission node using an IP address of the transmission node that is specified at the front of FIG. 7, and if many retransmissions occur only in a particular transmission node, the congestion detection unit 270 may not determine that the AP network is congested, determining that the back-end network is in trouble. As described above, an embodiment of the present disclosure guarantees the performance in various environments using additional correction techniques according to various circumstances.

When the congestion detection unit 270 according to an embodiment of the present disclosure determines whether the network status is congested, a moving average filter is applied as a basic mathematical algorithm. However, not only the moving average filter, but also various other filters is applied according to the situation, and the congestion detection unit 270 applies the filter according to the desired congestion detection scheme or level. The typical filter that is used in the congestion detection unit 270 includes a low pass filter including the moving average filter, and also includes a Wiener filter, a Kalman filter, a Savitzky-Golay smoothing filter, a particle filter and an unscented particle filter used to remove noises.

Referring back to FIG. 2, if it is determined that the AP network is congested, the congestion detection unit 270 notifies the congestion to the congestion information output unit 290, and if it is determined that the AP network is not congested, the congestion detection unit 270 delivers a predetermined control signal to the transport layer information extraction unit 230 to continuously detect the congestion. The congestion information output unit 290 delivers the congestion to the operating system or other applications to make it possible to control the congestion.

Figure 9:
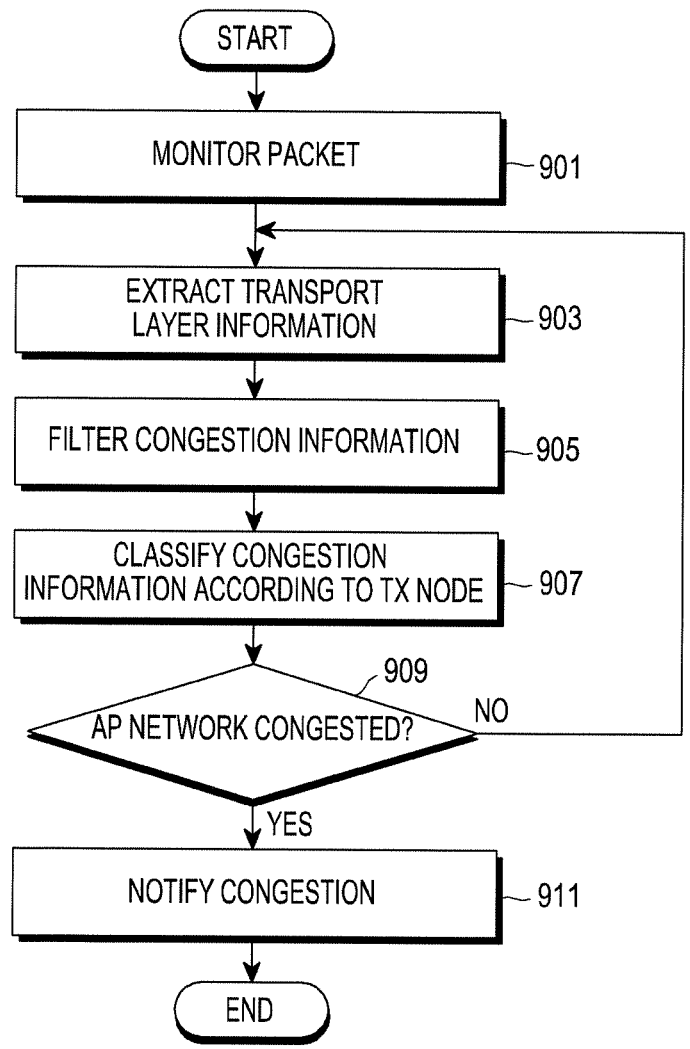
FIG. 9 illustrates a method to detect congestion of a wireless network according to this disclosure.

FIG. 9 illustrates a method to detect congestion of a wireless network according to this disclosure. Since a method for identifying a packet for determining congestion and a method for determining whether a network status is congested have been described in detail so far, a detailed description thereof will be omitted. Referring to FIG. 9, in operation 901, the physical layer information extraction unit 210 monitors all the packets transmitted to a wireless terminal. In other words, the physical layer information extraction unit 210 collects and extracts all the physical communication signals transmitted to the wireless terminal, and if the physical layer information extraction unit 210 is now performing communication based on the IEEE 802.11 standard, the physical layer information extraction unit 210 delivers the extracted IEEE 802.11 standard-based information to the upper layer.

In operation 903, the transport layer information extraction unit 230 collects and extract only the TCP frame information from the information delivered from the lower layer. In operation 905, the congestion information filtering unit 250 identifies a packet for determining congestion based on the extracted TCP frame information. Additionally, in operation 907, if the identified packet is a packet received from a plurality of transmission nodes, the congestion information filtering unit 250 classifies the congestion information according to the transmission node.

In operation 909, the congestion detection unit 270 determines whether the network status is congested, using the identified packet. Here, the congestion detection unit 270 determines whether the network status is congested, using Equation (2) to Equation (10). If it is determined in operation 909 that the network status is not congested, the congestion detection unit 270 returns to operation 903, and if it is determined in operation 909 that the network status is congested, the congestion detection unit 270 proceeds to operation 911. The case where the network status is not congested includes a case where the status of a back-end network or a server is poor.

In operation 911, upon receiving information indicating that the network status is congested, from the congestion detection unit 270, the congestion information output unit 290 delivers the congestion information to the operating system or other applications to make it possible to control the congestion. As described above, the main advantage of an embodiment of the present disclosure is that a wireless terminal determines congestion with the low power. This is a very important advantage of the wireless terminal, meaning that it is possible to continuously determine the congestion in real time.

Figure 10:
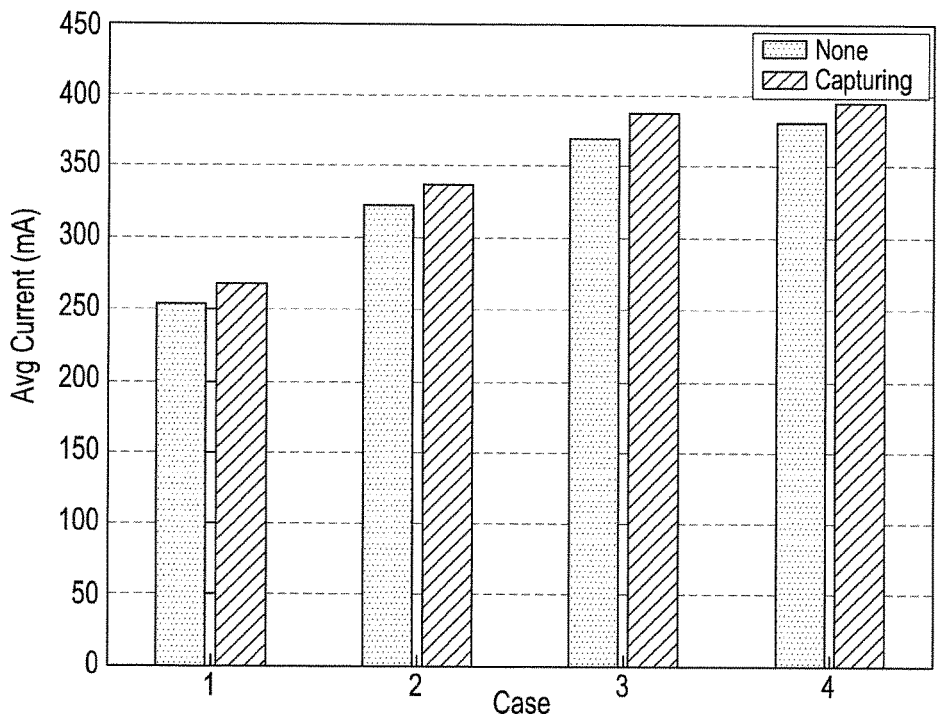
FIG. 10 is an example graph illustrating the experimental results obtained by comparing power consumption for a case in which an embodiment of the present disclosure is applied, with power consumption for a case in which an embodiment of the present disclosure is not applied, depending on the data throughput when a wireless terminal has connected to a wireless network by the 802.11 standard according to this disclosure.
Figure 11:
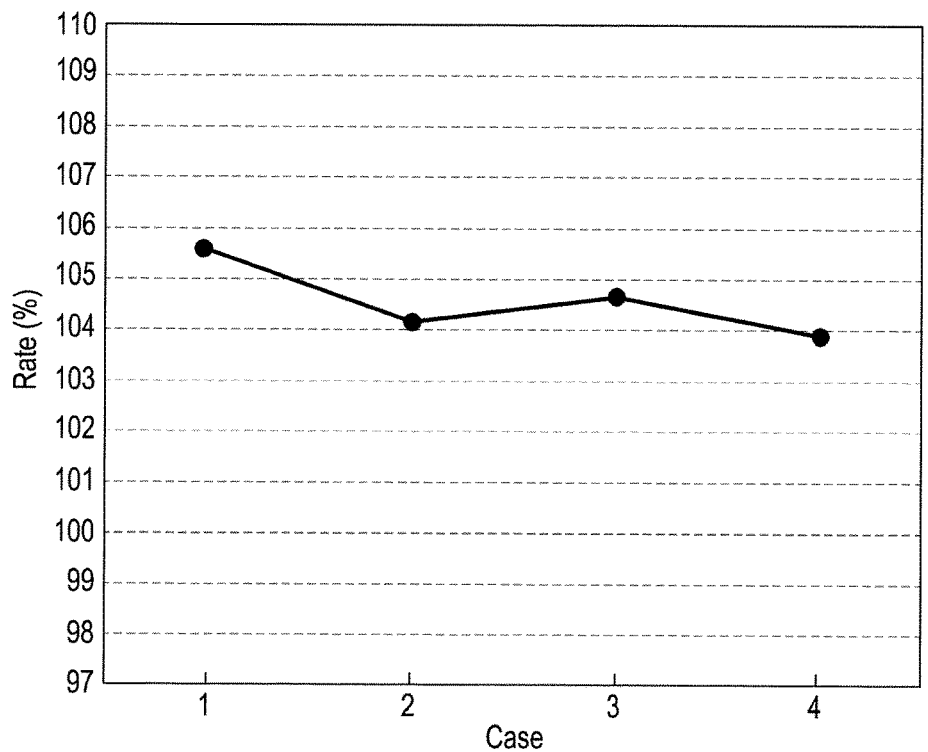
FIG. 11 is an example graph illustrating power consumption ratios for a case in which an embodiment of the present disclosure is applied and a case in which an embodiment of the present disclosure is not applied according to this disclosure.

FIG. 10 is an example graph illustrating the experimental results obtained by comparing power consumption for a case in which an embodiment of the present disclosure is applied, with power consumption for a case in which an embodiment of the present disclosure is not applied, depending on the data throughput when a wireless terminal has connected to a wireless network by the 802.11 standard according to this disclosure. FIG. 11 is an example graph illustrating power consumption ratios for a case in which an embodiment of the present disclosure is applied and a case in which an embodiment of the present disclosure is not applied according to this disclosure. The example graph of FIG. 11 is based on the experimental results in FIG. 10.

Referring to FIG. 10, Case 1 represents a case where data is received at 1 Mbps, Case 2 represents a case where data is received at 10 Mbps, Case 3 represents a case where data is received at 20 Mbps, Case 4 represents a case where data is received at 25 Mbps, None represents the power consumption for a case where packet monitoring is not performed (such as a case in which an embodiment of the present disclosure is not applied), and Capturing represents the results for a case where packet monitoring is performed (such as a case in which an embodiment of the present disclosure is applied). FIG. 11 illustrates a ratio of 'Capturing' (such as the case where packet monitoring is performed) to 'None' (such as the case where packet monitoring is not performed) for each 'Case', based on the results of FIG. 10.

As shown in FIGS. 10 and 11, it is seen that in a case where an embodiment of the present disclosure is applied to a wireless terminal, the power increase rate is not more than 6% compared with in a case where an embodiment of the present disclosure is not applied to the wireless terminal. Therefore, if the congestion detection method according to an embodiment of the present disclosure is used, the additional power consumption of the wireless terminal is very low. In other words, the congestion detection method provides a low-power technique.

In this way, if an embodiment of the present disclosure is applied to the wireless terminal, the increase in power consumption is not high. On the contrary, if the congestion of the AP network is left without being controlled, additional power consumption due to the retransmission is even greater. Therefore, an embodiment of the present disclosure expects a decrease in the overall power consumption, in that it is possible to determine congestion of an AP network and cope with the determination, thereby reducing the unnecessary power consumption due to the retransmission. Further, in an embodiment of the present disclosure, if the data throughput that the user now uses is low, or if a lot of data transmission/reception is not required, it is possible to further reduce the additional power consumption using a technique for making a pause in detecting congestion of the AP network. As for the above-described embodiment of the present disclosure, the width of its utilization is wide, since the embodiment of the present disclosure is applied to various fields. Hereinafter, an example of application of an embodiment of the present disclosure will be described. An embodiment of the present disclosure is applied to an AP connection manager.

Figure 12:
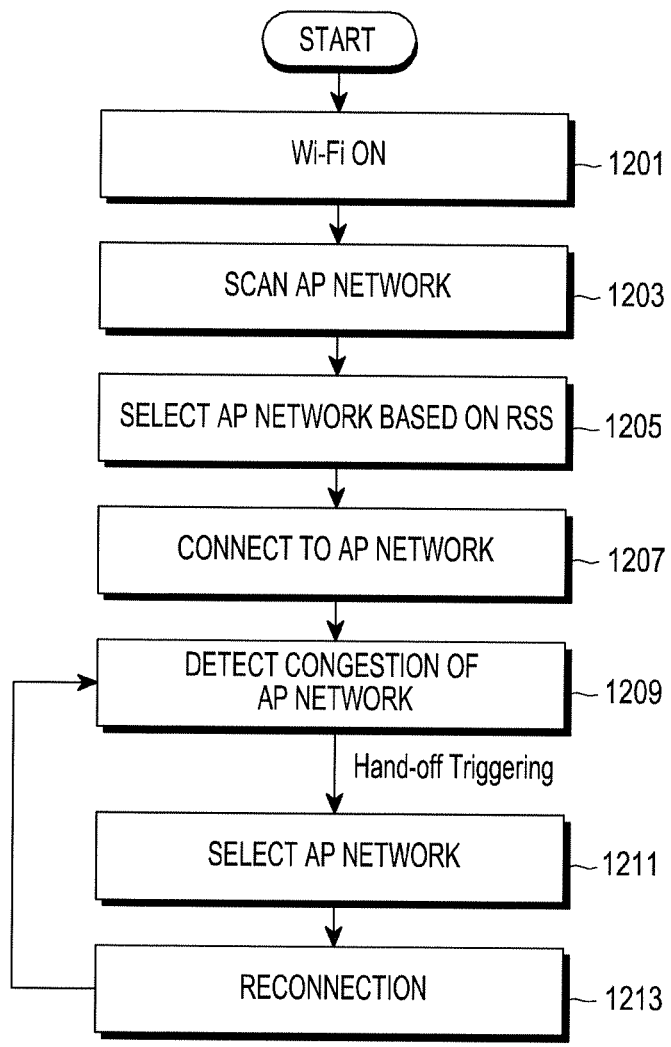
FIG. 12 illustrates an example method implemented by an AP connection manager in a wireless terminal according to this disclosure.

FIG. 12 illustrates an example method implemented by an AP connection manager in a wireless terminal according to this disclosure. Referring to FIG. 12, if Wi-Fi is turned on in operation 1201, the AP connection manager scans all the AP networks existing in the system in operation 1203. The AP connection manager select an AP network whose RSS is highest, from among the scanned AP networks in operation 1205, and connect to the selected AP network in operation 1207. Thereafter, the AP connection manager determines the status of the connected AP network to detect congestion in operation 1209. Upon detecting the congestion, the AP connection manager performs triggering to disconnect the connection with the existing AP network and attempt a new connection to another AP network in operation 1211, and performs reconnection to the re-selected AP network in operation 1213. If it is determined in operation 1211 that there is no proper AP network to be reconnected, the AP connection manager performs triggering such as using a cell network instead of the WLAN. It is possible to provide a service that allows the user to change settings of the wireless terminal, if the wireless terminal detects congestion of the AP network. For example, the wireless terminal notifies the user that the network status is poor due to the congestion of the AP network, and allows the user to change the settings of the wireless network.

Figure 13:
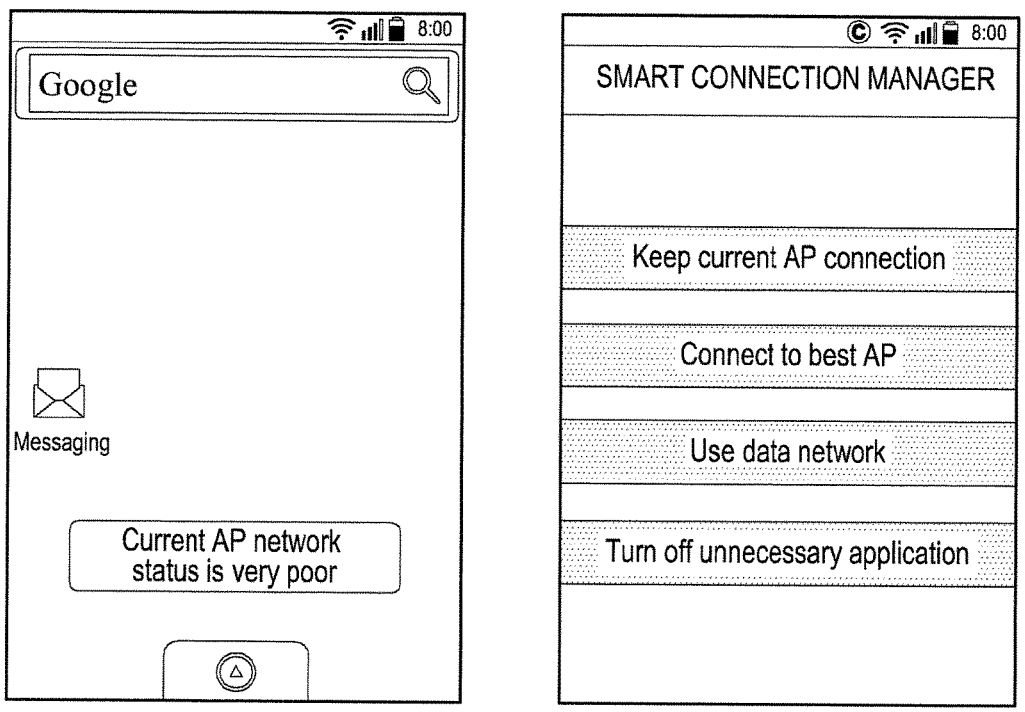
FIG. 13 illustrates an example user experience (UX) or user interface (UI) displaying poor network status due to the AP network's congestion on a wireless terminal according to this disclosure.

FIG. 13 illustrates an example user experience (UX) or user interface (UI) displaying poor network status due to the AP network's congestion on a wireless terminal according to this disclosure. Referring to FIG. 13, upon detecting the congestion of the AP network, the wireless terminal notifies the user of the congestion detection using a Toast message, and displays a logo indicating the congestion detection on a top status bar of a display. Thereafter, the wireless terminal provides the user with various options that the user selects. As illustrated in FIG. 13, the various options includes an option to keep the current AP connection, an option to connect to the best AP, an option to use the data network, and an option to turn off the unnecessary application. As another example, the wireless terminal changes the settings of the wireless terminal by itself, without notifying the user of the AP network's congestion.

Figure 14:
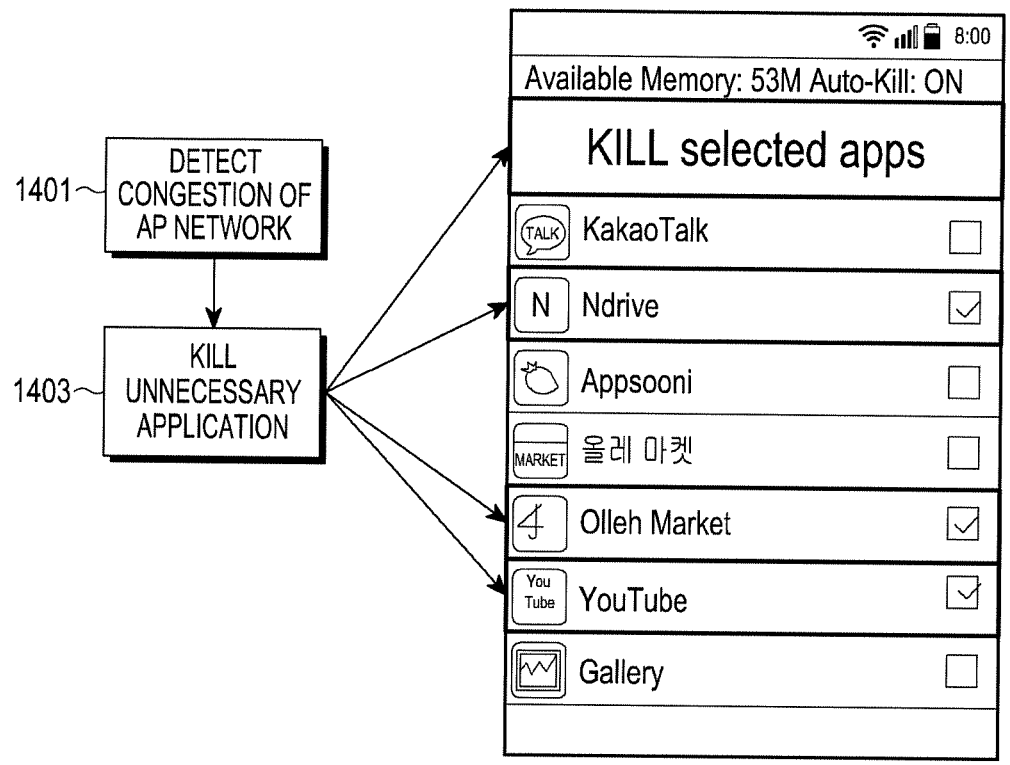
FIG. 14 illustrates an example of changing settings of a wireless terminal upon an occurrence of AP network's congestion in the wireless terminal according to this disclosure.

FIG. 14 illustrates an example of changing settings of a wireless terminal upon an occurrence of AP network's congestion in the wireless terminal according to this disclosure. Referring to FIG. 14, upon detecting the AP network's congestion in operation 1401, the wireless terminal kills the unnecessary data transfer application that is not currently in use, by itself in operation 1403. Due to this operation of the wireless terminal, it is possible to improve the data throughput of the applications that the user is interested in.

Figure 15:
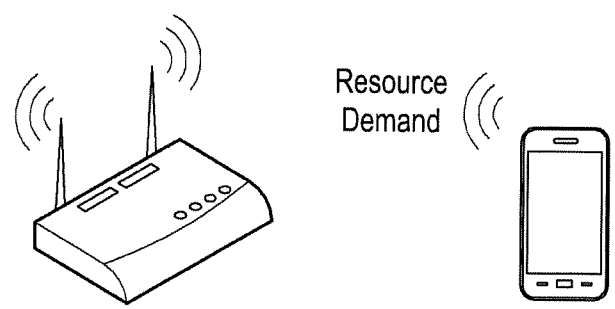
FIG. 15 illustrates an example of a case where an AP network connected with a wireless terminal supports a point coordination function (PCF) according to this disclosure.

FIG. 15 illustrates an example of a case where an AP network connected with a wireless terminal supports a point coordination function (PCF) according to this disclosure. If the AP supports point coordination function (PCF) as shown in FIG. 15 even though the wireless terminal has detected the AP network's congestion, the wireless terminal requests more network resources from the AP network, thereby improving the data throughput. As is apparent from the foregoing description, according to an embodiment of the present disclosure, the wireless terminal detects the congestion with the low power.

In addition, according to an embodiment of the present disclosure, unlike in the conventional method in which the transmission node detects congestion, the reception node (or the wireless terminal) detects congestion, thereby enabling the faster and more accurate determination and the independent response. The fact that the wireless terminal determines the congestion means that the wireless terminal makes efforts to improve the communication quality independently. If the service quality is not satisfactory even though the service quality does not correspond to the existing handover condition, the wireless terminal notifies the dissatisfaction to the operating system or other applications, thereby allowing the overall system of the wireless terminal to select the better network environment, thus enabling the faster and more flexible response.

Further, an embodiment of the present disclosure provides the method that is applied in the application level rather than a new protocol, so modification of the existing protocol is not necessary. If there is a need for an additional work to modify the existing system in order to apply the new method, a lot of money and efforts are required, and this is a great disadvantage. However, an embodiment of the present disclosure does not have this disadvantage since it is only needed to simply apply the embodiment of the present disclosure to the wireless terminal.

Although the present disclosure has been described with an exemplary embodiment, various changes and modifications is suggested to one skilled in the art. It is intended that the present disclosure encompass such changes and modifications as fall within the scope of the appended claims.

What is claimed is:

1. An apparatus to detect congestion of a network, the apparatus comprising:
   a transceiver; and
   one or more processors configured to:
   extract transmission control protocol frame information from information received from a lower layer;
   identify a packet including information related to retransmission, based on the transmission control protocol frame information;
   determine whether the network is congested based on the packet; and
   upon detecting congestion in the network, transmit information indicating the detection of the congestion in the network to an operating system or other applications.

2. The apparatus of claim 1, wherein the one or more processors are configured to identify the packet including the information related to retransmission if an acknowledge (ACK) packet included in the transmission control protocol frame information is the packet including information related to retransmission.

3. The apparatus of claim 2, wherein the ACK packet is configured in accordance with the following equation;

$$\text{ack } a_n \text{ win } w_n[\text{nop,nop,sack } s_n\{p_n:q_n\}]$$

where $a_n$ denotes a sequence number of an ACK packet, $w_n$ denotes a window size, $s_n$ denotes a number of packet sets received after transmission failure, sacks represents a selective acknowledgment, nop denotes no packet and $\{p_n:q_n\}$ denotes a packet set received after transmission failure.

4. The apparatus of claim 1, wherein one or more processors are configured to classify the packet according to a transmission node if the packet is received from a plurality of transmission nodes.

5. The apparatus of claim 1, wherein one or more processors are configured to:
   compare a ratio of an accumulation corresponding to a number of packets including the information related to retransmission to an accumulation corresponding to a total number of received packets with a preset congestion detection threshold; and
   determine that the network is congested, if the ratio of the accumulation corresponding to the number of packets including the information related to retransmission to the accumulation corresponding to the total number of received packets is greater than or equal to the preset congestion detection threshold.

6. The apparatus of claim 5, wherein if a high reliability should be given to a latest packet that has been received up to a present time since a predetermined time, the one or more processors are configured to avoid considering the number of packets including the information related to retransmission which were accumulated before the predetermined time.

7. The apparatus of claim 5, wherein if a ratio value of the number of packets including the information related to retransmission that have been received for a preset time to the total number of packets that have been received for a preset time exceeds a preset threshold, the one or more processors are configured to avoid counting the packets in the number of packets including the information related to retransmission determining that a burst error has occurred.

8. The apparatus of claim 1, wherein the one or more processors are configured to:
    compare a ratio value of a number of packets including the information related to retransmission to a total number of packets, which is included in the transmission control protocol frame information, with a threshold value that is determined according to a service quality; and
    determine that the network is congested, if the ratio value is greater than or equal to the threshold value that is determined according to the service quality.

9. The apparatus of claim 4, wherein if a number of packets including the information related to retransmission, which is twice or more greater than a average number of packets including the information related to retransmission per transmission node, is determined in a particular transmission node, the one or more processors are configured to determine that the network is not congested and determine that the particular transmission node is in trouble.

10. A method to detect congestion of a network, the method comprising:
    extracting transmission control protocol frame information from information received from a lower layer;
    identifying a packet including information related to retransmission, based on the transmission control protocol frame information;
    determining whether the network is congested based on the packet; and
    upon detecting congestion in the network, transmitting information indicating the detection of the congestion in the network to an operating system or other applications.

11. The method of claim 10, wherein the identifying comprises identifying the packet including the information related to retransmission if an acknowledge (ACK) packet included in the transmission control protocol frame information is the packet including the information related to retransmission.

12. The method of claim 10, wherein the ACK packet is configured in accordance with the following equation;

$$\text{ack } a_n \text{ win } w_n [\text{nop,nop,sack } s_n \{p_n:q_n\}]$$

where $a_n$ denotes a sequence number of an ACK packet, $w_n$ denotes a window size, $s_n$ denotes a number of packet sets received after transmission failure, sacks represents a selective acknowledgment, nop denotes no packet and $\{p_n:q_n\}$ denotes a packet set received after transmission failure.

13. The method of claim 10, wherein the identifying comprises classifying the packet according to a transmission node, if the packet is received from a plurality of transmission nodes.

14. The method of claim 10, wherein determining whether the network is congested comprises:
    comparing a ratio of an accumulation corresponding to a number of packets including the information related to retransmission to an accumulation corresponding to a total number of received packets with a preset congestion detection threshold; and
    determining that the network is congested, if the ratio of the accumulation corresponding to the number of packets including the information related to retransmission to the accumulation corresponding to the total number of received packets is greater than or equal to the preset congestion detection threshold.

15. The method of claim 14, wherein determining whether the network is congested comprises:
    if a high reliability should be given to a latest packet that has been received up to a present time since a predetermined time, avoiding considering the number of packets including the information related to retransmission which were accumulated before the predetermined time.

16. The method of claim 14, wherein determining whether the network is congested comprises:
    if a ratio value of the number of packets including the information related to retransmission that have been received for a preset time to the total number of packets that have been received for a preset time exceeds a preset threshold, avoiding counting the packets in the number of packets including the information related to retransmission determining that a burst error has occurred.

17. The method of claim 10, wherein determining whether the network is congested comprises:
    comparing a ratio value of a number of packets including the information related to retransmission to a total number of packets which is included in the transmission control protocol frame information with a threshold value that is determined according to a service quality; and
    determining that the network is congested if the ratio value is greater than or equal to the threshold value that is determined according to the service quality.

18. The method of claim 13, wherein determining whether the network is congested comprises:
    if a number of packets including the information related to retransmission, which is twice or more greater than a average number of packets including the information related to retransmission per transmission node, is determined in a particular transmission node, determining that the network is not congested and determining that the particular transmission node is in trouble.

* * * * *